Feb. 27, 1945. R. G. ANDERSON 2,370,127
ROTATIVE WINGED AIRCRAFT
Filed Sept. 9, 1941 4 Sheets-Sheet 2

INVENTOR.
Robert G. Anderson
BY
Symmestuott & Lechner
ATTORNEYS

Feb. 27, 1945.    R. G. ANDERSON    2,370,127
ROTATIVE WINGED AIRCRAFT
Filed Sept. 9, 1941    4 Sheets-Sheet 3
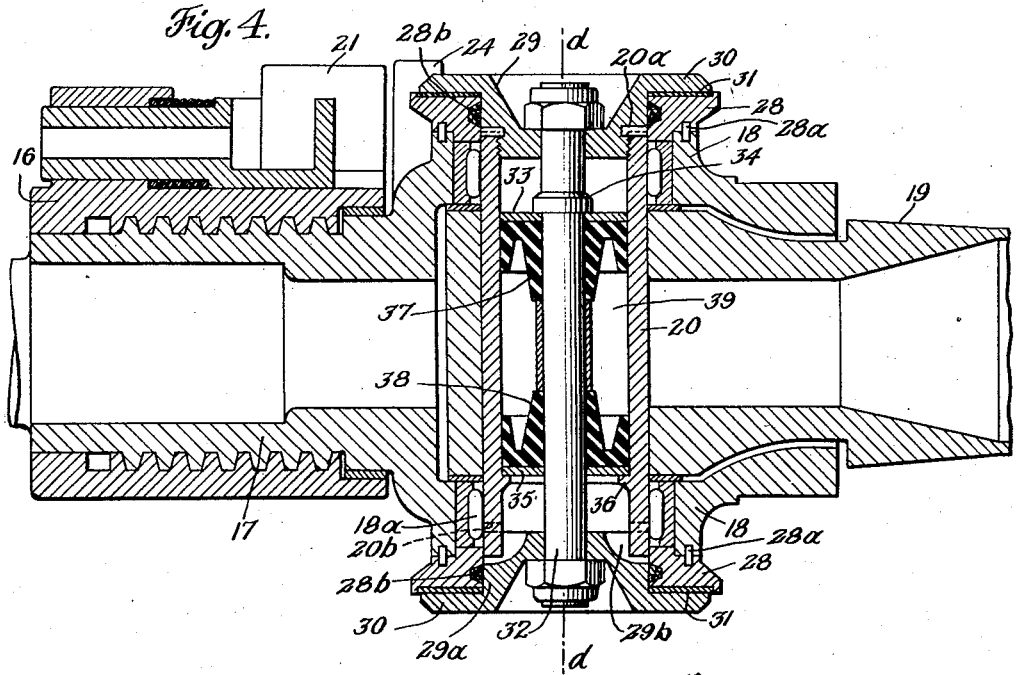
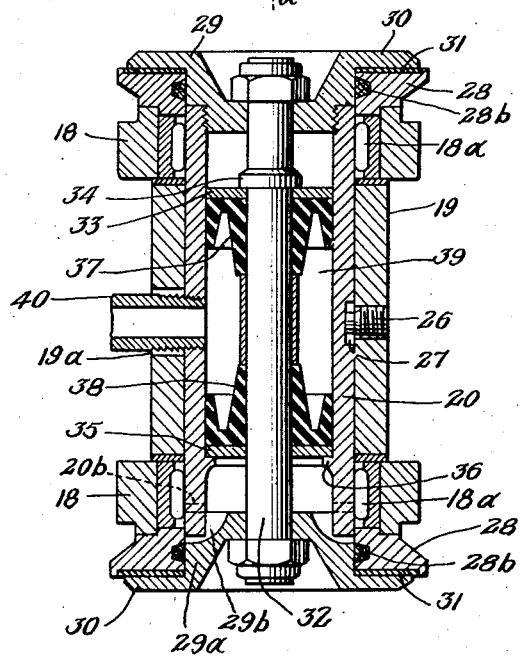
INVENTOR.
Robert G. Anderson
BY
ATTORNEYS Feb. 27, 1945.   R. G. ANDERSON   2,370,127
ROTATIVE WINGED AIRCRAFT
Filed Sept. 9, 1941   4 Sheets-Sheet 4
Fig. 7.
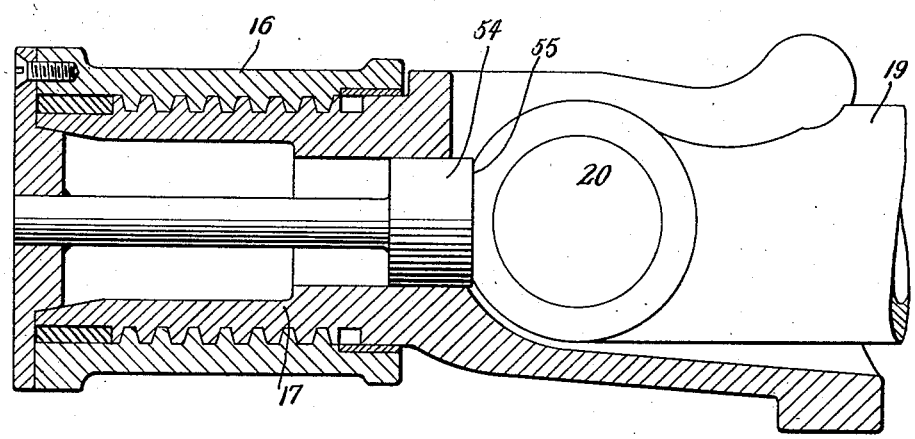
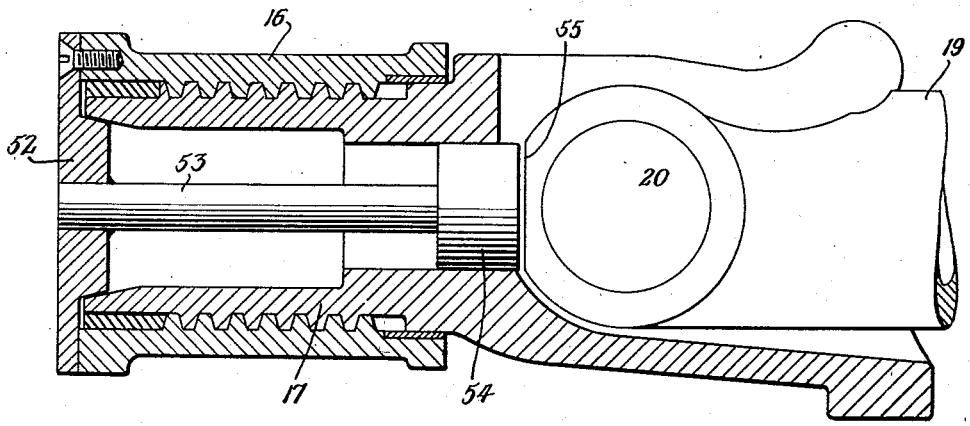
Fig. 6.
INVENTOR.
Robert G. Anderson
BY
Synnestvedt & Lechner
ATTORNEYS Patented Feb. 27, 1945

2,370,127

UNITED STATES PATENT OFFICE 2,370,127

ROTATIVE WINGED AIRCRAFT

Robert G. Anderson, Doylestown, Pa., assignor to Autogiro Company of America, Philadelphia, Pa., a corporation of Delaware Application September 9, 1941, Serial No. 410,135

15 Claims. (Cl. 244—18)

This invention relates to rotative winged aircraft.

The invention is of especial use in that type of rotative winged aircraft in which the rotor is normally aerodynamically or autorotationally actuated during flight, but in which a rotor drive is provided for initiating rotation of the rotor on the ground in preparation for take-off.

Still more specifically, the invention has particular reference to such aircraft equipped with variable pitch rotor blades providing for substantially vertical or "direct" take-off by driving the rotor while the machine is on the ground to a high rate of R. P. M. with the blades at low pitch, and then disconnecting the rotor drive and increasing the blade pitch so as to convert the stored kinetic energy into lift. This general type of take-off is described more fully in copending application of Juan de la Cierva, Serial No. 738,349, filed August 3, 1934.

A rotor and rotor hub structure of a type to which the invention is especially adaptable is illustrated in copending application of Agnew E. Larsen, Serial No. 271,841, filed May 5, 1939, now Patent 2,264,942 issued Dec. 2, 1941. As there disclosed, each rotor blade is connected with the hub not only by a flapping pivot but also by a drag pivot and a pitch change mounting. The drag pivot permits freedom for lag-lead movements of the blade under the influence of flight forces, particularly in translational flight.

It has been found that when driving the rotor with the machine on the ground to impart a high R. P. M. in preparation for take-off, resonant oscillations of the blades on their drag hinges have sometimes been set up, resulting in the imposition of undesirable strains in various parts of the machine, including the rotor and rotor mount. The primary object of the present invention resides in the provision of means for restraining lag-lead movements of the blades about their drag hinges during driving of the rotor in preparation for take-off, whereby to eliminate the building up of resonance conditions.

A further object of the invention is to provide for automatic restraint of lag-lead movements of the blades upon connection of the rotor drive, and automatic release of the blades for free lag-lead oscillation under the influence of flight forces, upon disconnection of the rotor drive.

The invention also contemplates other features of a control system for an aircraft of the type referred to, as will further appear.

How the foregoing and other objects and advantages which will occur to those skilled in the art are attained, will be apparent from the following description, referring to the accompanying drawings, in which—

Figure 4 is a longitudinal sectional view through the root end mounting illustrated in Figure 2, taken substantially in the plane containing the drag pivot axis;

Figure 5 is a sectional view taken as indicated by the line 5—5 on Figure 2, but with the drag pivot axis shifted to the vertical position on the sheet; and Figures 6 and 7 are top views, partly in plan and partly in horizontal section, of a portion of a modified blade root mounting, these two views illustrating two different positions of the parts.

Figure 1:
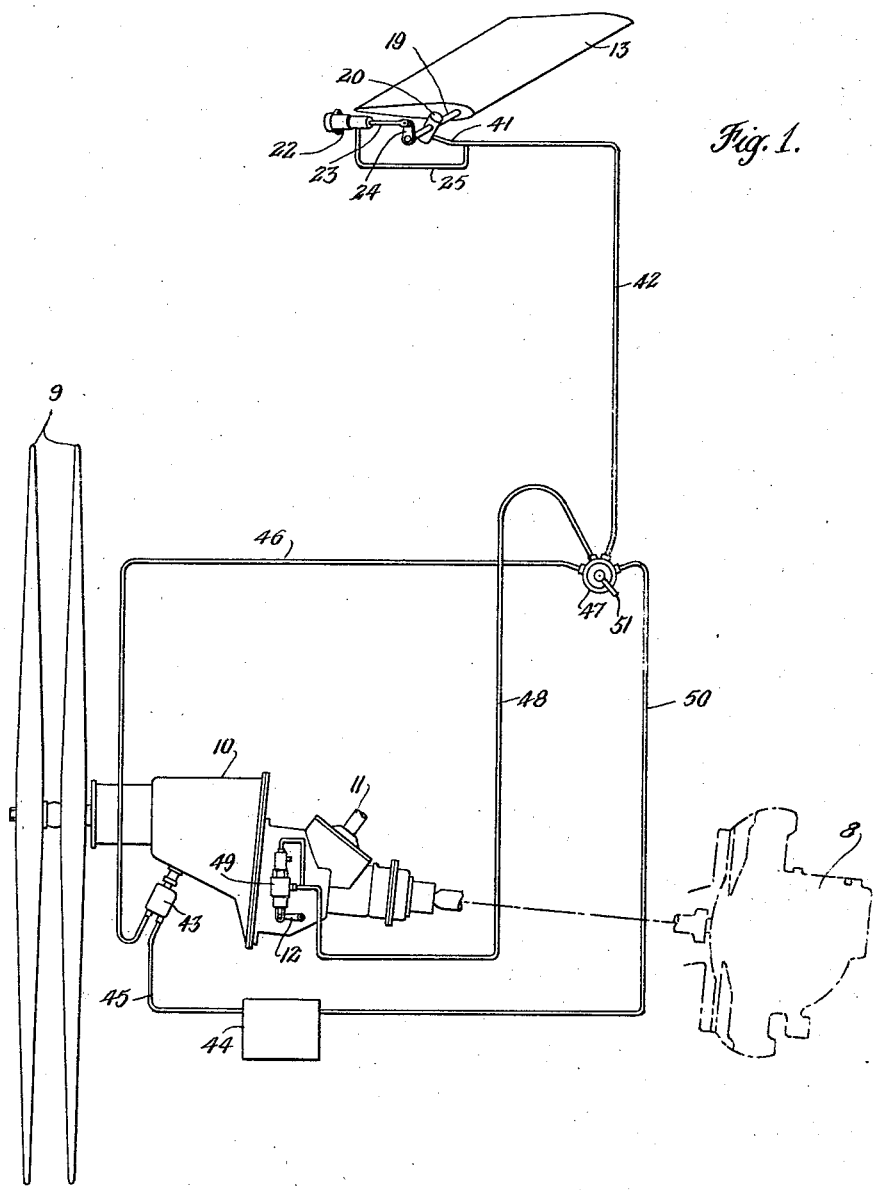
Figure 1 is a schematic layout illustrating certain parts of a rotative winged aircraft, with features of the invention, including the control system applied thereto.

The aircraft is provided with an engine shown at 8 in Figure 1, which engine is adapted to drive one or more propulsive airscrews 9 through a transmission generally indicated at 10. The transmission is adapted also to deliver torque to the rotor drive shaft 11, there being a disconnectible clutch incorporated in the transmission, actuable by an arm 12. Shaft 11 is extended for connection with the rotor hub, usually through an overrunning clutch, in a manner well understood in this art.

The rotor preferably incorporates a plurality of blades, one of which appears diagrammatically at 13 in Figure 1, each blade being connected with a rotative hub, shown at 14 in Figure 2, by a plurality of pivot devices considered individually hereinafter.

The blade pivots are, in general, arranged in accordance with the copending application of Agnew E. Larsen above referred to. Briefly, the blade mounting includes a flapping pivot having an axis f—f, by means of which the blade mounting fork 15 is connected with the hub. At the base of the fork there is an internally threaded sleeve 16 cooperating with an externally threaded sleeve 17 (see Figures 2 and 4), these sleeves providing for pitch change of the blade, the thread being oriented so that pitch increase accompanies radially outward movement of the blade and vice versa, as disclosed in the aforementioned copending Larsen application and also in Ray Patent No. 2,216,163, issued October 1, 1940. At its outer end the sleeve 17 is provided with a pair of apertured lugs 18—18 embracing the apertured inner end of the blade root fitting 19. Parts 18 and 19 are interconnected by a hollow drag pivot pin 20, providing a pivot axis d—d about which the blade may oscillate in flight.

Although the invention is also applicable to an arrangement incorporating a drag pivot having a vertical axis, in the structure shown the drag pivot axis d—d is obliquely inclined with reference to the hub axis. Specifically, the drag pivot illustrated is inclined upwardly and forwardly with respect to the blade. It may be mentioned that the drag pivot shown may be shifted to the vertical position for the purpose of facilitating blade folding in a manner which need not be considered in detail herein, although for a full description thereof reference may be made to Larsen Patent 2,220,109, issued November 5, 1940.

Figure 2:
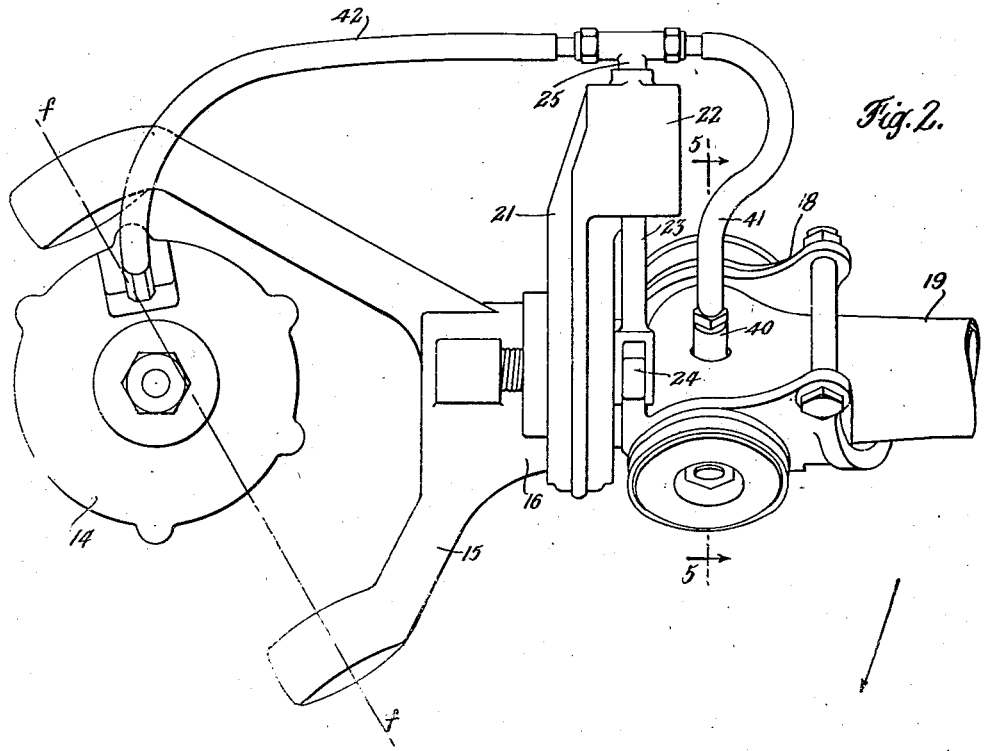
Figure 2 is a top plan view of the root end mounting of one of the rotor blades.
Figure 3:
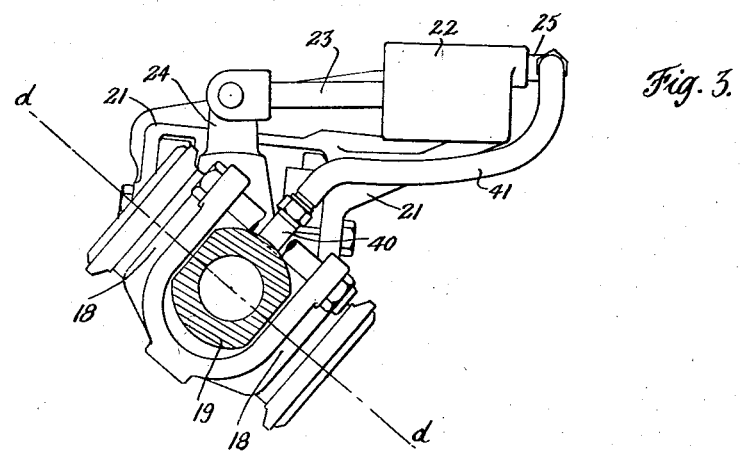
Figure 3 is an elevational view taken from the right of Figure 2, the blade root itself being shown in transverse section.

Referring again to the pitch change mounting for the blade, as will be seen in Figures 2 and 3, the outer threaded sleeve 16 carries a bracket 21 for supporting a fluid pressure cylinder and piston device 22, piston stem 23 projecting from one end of the cylinder for connection with arm 24 which is fixed with relation to the inner threaded sleeve 17. In accordance with the aforementioned Ray patent and Larsen application Serial No. 271,841, admission of fluid pressure to device 22 through connection 25 effects rotation of the inner threaded sleeve 17 in a direction to reduce the blade pitch (preferably to zero), this rotation of the sleeve 17 being accompanied by radially inward movement of the blade. Release of the fluid pressure permits the blade to move radially outwardly under the action of centrifugal force, thereby increasing the pitch angle.

The specific arrangement of the drag pivot is as follows:

Referring particularly to Figures 2, 4 and 5, the drag pivot 20 is secured in the blade root fitting 19 as against rotation by means of set screw 26, which engages a slot 27 elongated axially of the pivot so as to permit freedom for some relative axial movement between the pivot pin itself and the blade root fitting. Bearings 18a are provided for free rotation of pin 20 in the apertured lugs 18. Toward each end of the pivot 20 a ring 28 is positioned with a portion overlying the outer face of each apertured lug 18, each ring 28 being restrained as against rotation with respect to the adjacent lug 18 by one or more pins 28a. End caps 29 and 29a are also arranged one at each end of the assembly, each cap having a flange 30 overlying the outer face of the adjacent ring 28 and friction material 31 is interposed therebetween. To prevent lubricant from reaching the friction rings, packings 28b are interposed between lugs 28 and cap members 29 and 29a. A through bolt 32 retains the parts in assembled relation.

Cap 29 is secured against rotation with respect to pivot member 20 by means of pins 20a, and relative rotation of the pivot member and cap 29a is restrained by ears or lugs 29b which engage slots 20b formed in the end of pivot 20. Slots 20b are deep enough to permit axial movement between the pivot pin and cap 29a.

Interiorly of the drag pivot 20 a flat ring 33 is arranged on pin 32 in position to abut the shoulder 34 formed on the pin. A similar ring 35 is freely movable with respect to pin 32 but adapted to abut shoulder 36 formed interiorly of the pivot 20. A pair of resilient piston-like sealing devices 37 and 38 bear, respectively, against rings 33 and 35 and define the ends of a central annular pressure chamber 39 within the drag pivot 20. Pressure fluid may be admitted to chamber 39 through connection 40, which extends from the pivot pin 20 through an enlarged aperture 19a in member 19, thereby permitting freedom of motion between members 19 and 20. Connection 40 is coupled by flexible tube 41 with an additional flexible fluid pressure supply conduit 42, which serves also for delivery of pressure through connection 25 to the blade pitch change cylinder 22. Flexible connection 42 extends inwardly to the rotor hub 14 and downwardly therethrough in a manner which need not be considered in detail herein, the same being fully disclosed in the aforementioned Larsen application Serial No. 271,841. It is noted, however, that as shown in Figure 1, the connection 42 is associated with a fluid pressure control system referred to shortly below.

At this point it is mentioned that admission of fluid pressure to the chamber 39 within the drag pivot 20 acts to urge the resilient elements 37 and 38 away from each other, the latter transmitting its force to the pivot 20 itself and thence to cap member 29, and the former transmitting its force to the pin 32 and thence to cap member 29a, so that the flanges 30—30 of the two cap members are tightened against the adjacent friction material 31 and rings 28. This results in the imposition of a substantial friction damping force with reference to movement of the blade root member 19 about the axis of the drag pivot 20, it being noted again that set screw 26 fixes the pivot itself as against rotation with respect to member 19. Relief of the pressure in chamber 39 removes the friction damping pressure so that the blade may then freely swing about the axis of the drag pivot. Thus the above mechanism provides two different operating conditions which are respectively characterized by relative freedom for and restraint of blade swinging movement.

Attention is now directed to the control system shown in Figure 1. A fluid pressure pump 43 is driven from the transmission 10, receiving fluid from reservoir 44 through connection 45, and delivering fluid pressure through connection 46 to the primary control valve 47. Connection 42 also communicates with valve 47 and is adapted to receive fluid pressure therethrough, as is also an additional pipe 48 which is extended to the fluid pressure cylinder device 49, the piston of which is coupled with the actuating lever 12 for the rotor drive clutch. A return line 50 extends from valve 47 to the reservoir 44.

Various parts of the fluid pressure control system just mentioned are fully disclosed in copending application of Agnew E. Larsen, Serial No. 363,593, filed October 31, 1940, now Patent No. 2,324,588, issued July 20, 1943, and need not be considered in detail herein. It is to be understood, however, that actuation of the handle 51 of the control valve serves to provide two alternative conditions. In one adjustment, pressure is delivered from pipe 46 to both of pipes 42 and 48; and in the other adjustment, pipes 42 and 48 are coupled with the relief line 50 so as to dissipate pressure in pipes 42 and 48.

The operation of the foregoing arrangement is as follows:

When the aircraft is on the ground and it is desired to effect a take-off, the control valve 51 is moved in a clockwise direction from the full line position of Figure 1, so as to admit fluid pressure from pipe 46 to pipes 42 and 48. This causes engagement of the rotor drive clutch, decrease of rotor blade pitch and establishment of the pressure condition resisting drag movement of the blade about the drag pivot axis $d-d$. The engine is now gradually speeded up until the desired take-off R. P. M. is attained, at which time the operating handle 51 of the control valve 47 is moved to the full line position shown in Figure 1, whereupon the rotor drive clutch is disconnected, the blade pitch increased and the pressure relieved in chamber 39 within the drag pivot 20, so as to permit free lag-lead oscillations of the blades.

By the foregoing mechanism lag-lead oscillations of the blades are automatically restrained when the rotor drive clutch is connected to accelerate the rotor in preparation for effecting take-off. Building up of vibrations or resonant oscillations during the acceleration period is, therefore, eliminated. When the control system is actuated to disconnect the rotor drive clutch and increase the blade pitch to effect take-off, the restraint imposed on drag movements of the blade is automatically removed and the blades are thus free to swing in the lag-lead sense under the influence of flight forces.

A modified arrangement for automatically restraining lag-lead movements during drive of the rotor in preparation for take-off is illustrated in Figures 6 and 7. Certain of the parts shown in these figures are the same as those described above and have, therefore, been identified with the same reference characters. Thus it will be seen that a pitch change mounting incorporating outer and inner telescoped and complementarily threaded sleeves 16 and 17 are employed. In the modified arrangement a plate member 52 is connected with the inner end of the outer sleeve 16 and carries a pin 53 with an abutment 54 at the outer end thereof in position to abut a flatted surface 55 formed on the blade root fitting 19 at the radially inward side of the drag pivot 20. As shown in Figure 6, the blade occupies that position on the pitch change mounting providing for increased blade pitch. The blade, at this time, is displaced radially outwardly with reference to the outer threaded sleeve 16, so that clearance is provided between the flatted surface 55 and the abutment 54 and in this condition the blade has limited freedom for angular movement in the lag-lead sense about the axis of the drag pivot. If a greater range of free drag movement is desired under the normal flight condition, the thread angle of the threaded mounting sleeves 16 and 17 may be increased.

When the control system is actuated to deliver torque to the rotor for starting purposes and to reduce the blade pitch, the pitch reducing movement causes the blade to move radially inwardly with reference to the outer sleeve 16 and the abutment 54, so that said abutment contacts the flatted surface 55 and positively prevents lag-lead oscillation of the blade.

Thus the arrangement of Figures 6 and 7 also provides automatic restraint of lag-lead movements during initiation of rotation of the rotor and automatic freeing of the blade upon disconnection of the rotor drive for take-off.

I claim:

1. In an aircraft having a bladed sustaining rotor, a mounting for a blade including means providing for pitch change movement thereof and a pivot providing for lag-lead movement thereof, fluid pressure actuable means for changing the blade pitch, a releasable device for restraining lag-lead movement of the blade, fluid pressure actuable means for controlling said device, and a fluid pressure system for controlling both of said means in common, arranged to effect conjoint decrease of blade pitch and conditioning of said device to restrain lag-lead movement, and conjoint increase of blade pitch and release of said device.

2. A construction in accordance with claim 1 in which the aircraft further incorporates a disconnectible rotor drive and in which means are provided interrelating the operation of the rotor drive and said fluid pressure system in that sense providing for decrease of rotor blade pitch when the rotor drive is connected and for increase of rotor blade pitch when the rotor drive is disconnected.

3. In an aircraft having a bladed sustaining rotor and a disconnectible rotor drive, means providing for free blade movement in the lag-lead sense in translational flight when the rotor is not being driven, and releasable means for restraining blade movement in the lag-lead sense when the rotor is being driven.

4. In an aircraft having a bladed sustaining rotor and a disconnectible rotor drive, means providing for blade movement in the lag-lead sense, releasable means for restraining lag-lead movement, and a control system interrelating the operation of the rotor drive and said releasable means and providing for release of said means to permit free lag-lead oscillation upon disconnection of the rotor drive, and further providing for actuation of said means to restrain lag-lead oscillation upon connection of the rotor drive.

5. In an aircraft having a bladed sustaining rotor and a disconnectible rotor drive, a blade mounting including a pitch change pivot and a pivot for movement in the lag-lead sense, releasable means for restraining movement on the lag-lead pivot, and mechanism providing for conjoint release of said means and increase of blade pitch on said pitch change pivot, and vice versa.

6. In an aircraft having a bladed sustaining rotor and a disconnectible rotor drive, a blade mounting including a pitch change pivot and a pivot for movement in the lag-lead sense, releasable means for restraining movement on the lag-lead pivot, mechanism providing for conjoint release of said means and increase of blade pitch on said pitch change pivot, and vice versa, and a control system interrelating the operation of the rotor drive and said mechanism and providing for actuation of said mechanism to condition the releasable means to resist lag-lead movement conjointly with connection of the rotor drive.

7. For an aircraft sustaining rotor, a blade mounting pivot providing freedom for movement in the lag-lead sense, a blade movement damper for resisting lag-lead movement, and mechanism for establishing and relieving the resistive force of said damper including a member controllable by the pilot while the rotor is rotating and an actuating connection extended from said member to said damper.

8. For an aircraft sustaining rotor, a blade mounting pivot providing freedom for movement in the lag-lead sense, relatively movable complementary abutments one position of adjustment of which defines a limited range of freedom for lag-lead oscillation, and another position of adjustment of which prevents lag-lead movement, and controllable means for adjusting said abutments.

9. For an aircraft sustaining rotor, a rotor blade mounting pivot providing freedom for swinging movement of the blade with respect to the rotor hub, a friction device associated with said pivot for restraining blade swinging movement with respect thereto, and controllable fluid pressure means for altering the frictional resistance of said device.

10. An aircraft sustaining rotor blade mounting including a pair of mounting parts telescoped substantially coaxially with the blade axis and having complementary threading providing for change of blade pitch with radial movement of the blade, a blade mounting pivot the axis of which extends generally transverse the longitudinal axis of the blade to provide for swinging movement of the blade, and a stop device for restraining swinging movement of the blade, the stop device being displaceable to permit free swinging and being connected with said threaded blade mounting to provide for displacement thereof under the influence of radial movement of the blade incident to pitch change movement thereof on said threaded mounting.

11. A construction in accordance with claim 10 in which the sense of threading of the pitch change mounting is such that radially outward movement of the blade is accompanied by increase of blade pitch and radially inward movement by decrease of blade pitch, and further in which the stop device is conditioned to restrain swinging movement of the blade about said pivot upon radially inward movement of the blade to decrease its pitch.

12. For an aircraft sustaining rotor, a blade mounting pivot providing freedom for movement in the lag-lead sense, a blade movement damper for resisting lag-lead movement, and mechanism for altering the resistive force of said damper including a member controllable by the pilot while the rotor is rotating and an actuating connection extended from said member to the damper.

13. For an aircraft sustaining rotor, a blade mounting pivot providing freedom for swinging movement of the blade, a blade movement damper for resisting said swinging movement, and controllable fluid pressure means for altering the frictional resistance of said damper including fluid pressure piston and cylinder means housed in said blade mounting pivot and operatively connected to the damper parts.

14. In an aircraft having a bladed sustaining rotor and a disconnectible rotor drive, a blade mounting including a pitch change pivot and a pivot providing for swinging movement of the blade with respect to the rotor hub, releasable means for restraining movement on said latter pivot, and mechanism providing for conjoint release of said means and increase of blade pitch on said pitch change pivot.

15. In an aircraft having a bladed sustaining rotor, a rotor blade mounting pivot adapted to accommodate blade swinging movement with respect to the rotor hub, means for imposing conditions of relative restraint of and freedom for said blade swinging movement, said means being so constructed that its restraint is of a yielding character, against the resistance of which the blade may move, and mechanism for regulating said means including a member controllable by the pilot while the rotor is rotating and an actuating connection extended from said member to said means.

ROBERT G. ANDERSON.